United States Patent
Gong et al.

(10) Patent No.: US 7,953,766 B2
(45) Date of Patent: May 31, 2011

(54) GENERATION OF ATTRIBUTE LISTINGS FOR UNIQUE IDENTIFICATION OF DATA SUBSETS

(75) Inventors: Wen G. Gong, Cupertino, CA (US); Adam Scott Grancell, Mountain View, CA (US)

(73) Assignee: Siebel Systems, Inc., San Mateo, CA (US)

( * ) Notice: Subject to any disclaimer, the term of this patent is extended or adjusted under 35 U.S.C. 154(b) by 407 days.

(21) Appl. No.: 11/080,226

(22) Filed: Mar. 14, 2005

(65) Prior Publication Data

US 2007/0220055 A1    Sep. 20, 2007

Related U.S. Application Data

(60) Division of application No. 10/177,517, filed on Jun. 21, 2002, now Pat. No. 6,915,306, which is a continuation of application No. 09/896,924, filed on Jun. 29, 2001, now abandoned.

(51) Int. Cl.
*G06F 7/00* (2006.01)
*G06F 17/30* (2006.01)

(52) U.S. Cl. ........................... 707/803; 707/736

(58) Field of Classification Search ............... 707/5, 803, 707/736
See application file for complete search history.

(56) References Cited

U.S. PATENT DOCUMENTS

| | | | | |
|---|---|---|---|---|
| 4,930,071 A * | 5/1990 | Tou et al. | ............... | 707/4 |
| 5,201,047 A * | 4/1993 | Maki et al. | ............... | 707/4 |
| 5,379,422 A * | 1/1995 | Antoshenkov | ............... | 707/1 |
| 5,659,728 A * | 8/1997 | Bhargava et al. | ............... | 707/2 |
| 5,946,681 A * | 8/1999 | Shorter | ............... | 707/3 |
| 5,966,126 A * | 10/1999 | Szabo | ............... | 715/762 |
| 6,356,897 B1 | 3/2002 | Gusack | | |
| 6,721,727 B2 | 4/2004 | Chau et al. | | |
| 6,832,069 B2 | 12/2004 | Stout et al. | | |
| 6,839,720 B1 | 1/2005 | Thibodeau | | |
| 6,915,306 B1 | 7/2005 | Gong et al. | ............... | 707/102 |
| 2002/0013735 A1* | 1/2002 | Arora et al. | ............... | 705/26 |
| 2002/0049753 A1* | 4/2002 | Burrows | ............... | 707/3 |
| 2002/0059003 A1 | 5/2002 | Ruth et al. | | |
| 2002/0059260 A1* | 5/2002 | Jas | ............... | 707/100 |
| 2002/0072891 A1 | 6/2002 | Shimizu | | |
| 2002/0095561 A1 | 7/2002 | Butler | | |

(Continued)

OTHER PUBLICATIONS

Zhe Li et al. "Fast Joins using Join Indicies, The VLDB Journal—The International Journal on Very Large Data Bases", vol. 8, Issue 1, (Apr. 1999), Springer-Verlag, pp. 1, 4.*

(Continued)

*Primary Examiner* — Brent Stace
(74) *Attorney, Agent, or Firm* — Campbell Stephenson LLP

(57) ABSTRACT

Techniques to generate data models for an item master having a number of items. Each item is associated with a number of attributes and each attribute is associated with a set of values. In one method, the items in the item master are initially classified into a number of pagesets, with each pageset being defined by a unique combination of values for a first set of (classification) attributes. For each pageset, a second set of (selectable) attributes is determined to uniquely identify the items in the pageset. The selectable attributes may be selected from a list of candidate attributes, which may include mandatory attributes designated to be used as selectable attributes and optional attributes that may be selected for use. Data models are generated for each pageset based in part on the selectable attributes, and include a set of tables descriptive of the items in the pageset.

7 Claims, 10 Drawing Sheets

U.S. PATENT DOCUMENTS

2008/0046474 A1* 2/2008 Sismanis .................. 707/200

OTHER PUBLICATIONS

A. V. Aho et al., "The Theory of Joins in Relational Databases", ACM Transactions on Database Systems vol. 4, Issue 3 (Sep. 1979), ACM Press, pp. 297-314.*

David Livingstone, "The Integration of Relational Database Algebra into APL", International Conference on APL, Proceedings of the international Conference on APL, Manchester, United Kingdom (1986), ACM Press, pp. 211-220.*

Huscher, Brent, "Database Design and Modeling Fundamentals" Jun. 30, 2000, www.sqlteam.com <http://www.sqlteam.com/article/database-design-and-modeling-fundamentals>, p. 1-5.*

McLellan, Tim, "Data Modeling: Finding the Perfect Fit" 1995, www.islandnet.com <http://www.islandnet.com/~tmc/html/articles/datamodl.htm>, p. 1-6.*

Halpin, Terry, "Information Modeling and Relational Databases" screencaptures of book pages available from google books (link too long to fit in this field), p. 1-7.*

Sismanis, Yannis, et al., "Gordian: Efficient and Scalable Discovery of Composite Keys" Sep. 12-15, 2006, ACM (VLDB), p. 691-702.*

* cited by examiner

|  | Classification Columns 120 | | Candidate Attribute Columns 130 | | | Data Attribute Columns 140 | | | | |
|---|---|---|---|---|---|---|---|---|---|---|
| ID | Gender | Type | Style | Size | Color | Desc | Price | Item Number | Image | |
| 1 | woman | pants | dress | 2 | blue | blue d... | 69.95 | 125 | 125.gif | ⎫ Pageset 1 |
| 2 | woman | pants | dress | 4 | black | blk d... | 69.95 | 126 | 126.gif | |
| 3 | woman | pants | casual | 4 | blue | blue c... | 59.95 | 127 | 127.gif | |
| 4 | woman | pants | casual | 6 | grey | grey c... | 59.95 | 128 | 128.gif | ⎭ |
| ⋮ | | | | | | | | | | |
| 56 | woman | dress | long | 4 | blue | blue l... | 74.95 | 181 | 181.gif | ⎫ Pageset 2 |
| 57 | woman | dress | long | 8 | white | white l. | 74.95 | 182 | 182.gif | |
| 58 | woman | dress | short | 2 | red | red s... | 39.95 | 187 | 187.gif | |
| 59 | woman | dress | short | 6 | white | white s. | 39.95 | 188 | 188.gif | ⎭ |
| ⋮ | | | | | | | | | | |
| 87 | woman | blouse | short | 8 | white | white s. | 39.95 | 236 | 236.gif | ⎫ Pageset 3 |
| 87 | woman | blouse | short | 10 | black | black s. | 39.95 | 237 | 237.gif | |
| 87 | woman | blouse | long | 6 | blue | blue l... | 49.95 | 238 | 238.gif | ⎭ |
| ⋮ | | | | | | | | | | |
| 130 | man | pants | dress | 32 | khaki | khaki d. | 55.95 | 271 | 271.gif | ⎫ Pageset 4 |
| 131 | man | pants | dress | 34 | blue | blue d... | 55.95 | 272 | 272.gif | |
| 132 | man | pants | casual | 40 | grey | grey c... | 39.95 | 273 | 273.gif | |
| 132 | man | pants | casual | 42 | blue | blue c... | 39.95 | 274 | 274.gif | ⎭ |
| ⋮ | | | | | | | | | | |
| 245 | man | shirt | long | 34 | white | white l.. | 34.95 | 311 | 311.gif | ⎫ Pageset 5 |
| 246 | man | shirt | long | 34 | blue | blue l... | 34.95 | 312 | 312.gif | ⎭ |
| ⋮ | | | | | | | | | | |

*FIG. 1*

"Style" Feature Table 310a

| Code | Desc | Default |
|---|---|---|
| 0 | dress | - |
| 1 | casual | default |
| 2 | twill | - |
| 3 | jean | - |

"Size" Feature Table 310b

| Code | Desc | Default |
|---|---|---|
| 0 | 2 | - |
| 1 | 4 | - |
| 2 | 6 | default |
| 3 | 8 | - |
| 4 | 10 | - |
| 5 | 12 | - |
| 6 | 14 | - |

"Color" Feature Table 310c

| Code | Desc | Default |
|---|---|---|
| 0 | blue | default |
| 1 | black | - |
| 2 | grey | - |

"Items" Feature Table 320

| Code | Desc | ID | Price | Item Number | Image | Default |
|---|---|---|---|---|---|---|
| 0 | blue d... | 1 | 69.95 | 125 | 125.gif | - |
| 1 | blk d... | 2 | 69.95 | 126 | 126.gif | - |
| 2 | blue c... | 3 | 59.95 | 127 | 127.gif | default |
| 3 | grey c... | 4 | 59.95 | 128 | 128.gif | - |
| 4 | ⋮ | | | | | |
| 5 | | | | | | |

Main Configuration Table 330

| Sub-table | Rule |
|---|---|
| Attribute_Check | |

"Attribute_Check" Configuration Sub-table 340

| Style | Size | Color | Items | Rule |
|---|---|---|---|---|
| 0 | 0 | 0 | | |
| 0 | 1 | 1 | | |
| 1 | 1 | 0 | | |
| 1 | 2 | 2 | | |
| ⋮ | | | | |
| | | | | |

Data Row Set / Exception Row Set

FIG. 3

GENERATION OF ATTRIBUTE LISTINGS FOR UNIQUE IDENTIFICATION OF DATA SUBSETS

CROSS-REFERENCE TO RELATED APPLICATIONS

This application is a divisional of U.S. patent application Ser. No. 10/177,517, filed Jun. 21, 2002, which is a continuation of U.S. patent application Ser. No. 09/896,924, filed Jun. 29, 2001, each of which is hereby incorporated by reference in its entirety.

BACKGROUND OF THE INVENTION

The present invention relates generally to computer processing, and more particularly to techniques for generating data models and user interfaces for catalog-type applications.

For some business enterprises, a large number of products or items may need to be organized and categorized for presentation in a clear and logical manner, such as with a catalog. For example, a retailer or a distributor may carry a large number of items in its inventory. These items may then be categorized into a number of groups (e.g., hundreds or thousands of groups) of related items. Each group may include one or more items and may be represented with a "pageset".

Catalog-type applications such as the one described above are typically characterized by a large number of relatively simple items. These items may be associated with various attributes used to identify and describe the items. If the items can be sufficiently described and uniquely identified based solely on their attribute values, then the attributes may be used to classify the items into groups and to further identify the items in each group.

Each group of items may be represented with "data models" that describe the items in the group. These data models are typically of a particular defined format or schema and include sufficient information such that they may be used to generate user interface (UI) elements, such as frames or screens for a catalog. Items in each group may then be clearly and logically present via these UI elements. For catalog-type applications, the data models tend to be similar from group to group (i.e., pageset to pageset).

Catalog-type applications tend to be large, with many items, and the task of organizing and classifying the items becomes more challenging as the number of items increases. However, catalog-type applications also tend to be repetitive, which affords the use of similar data models for representing the groups of items. Techniques that can be used to automatically generate data models and user interfaces for catalog-type applications are thus highly desirable.

SUMMARY OF THE INVENTION

The invention provides techniques to automatically generate data models from an "item master" (e.g., a master table) that includes a number of items. A set of classification attributes is initially provided (e.g., by an administrator via a user interface screen or automatically generated) and used to classify the items in the item master into pagesets. Data models may then be automatically generated for each pageset based in part on a set of candidate attributes (which may also be provided by the administrator via the user interface screen or in a configuration file). The data models are thereafter used to generate user interface (UI) elements, which can present the items in each pageset in a clear and logical manner. Various implementations of the invention are possible, some of which are described below.

A specific embodiment of the invention provides a method for generating data models for an item master having a number of items. Each item in the item master is associated with a number of attributes and each attribute is associated with a respective set of possible values. In accordance with the method, the items in the item master are initially classified into a number of pagesets. Each pageset is defined by a unique combination of values for a first set of attributes (referred to as classification attributes). A second set of attributes (referred to as selectable attributes) is then determined for each pageset, with the selectable attributes being used to uniquely identify the items in the pageset. Data models are then generated for each pageset based in part on the selectable attributes. In one implementation, the data models include a set of tables descriptive of the items in the pageset.

The classification attributes may be specified (e.g., by an administrator) via configuration variables. The selectable attributes may be selected from a list of candidate attributes, which may include mandatory and optional attributes. Mandatory attributes are designated to be used as selectable attributes. Optional attributes may be specified in an ordered list and may be selected for use as selectable attributes based on their order in the list. Each pageset includes a sufficient (e.g., minimum) number of attributes such that the items in the pageset are uniquely identified by their selectable attribute values.

The data models for each pageset may include a number of features tables and configuration tables. One feature table is provided for each selectable attribute and includes a mapping of codes to descriptions corresponding to all possible attribute values. The configuration tables identify valid and invalid configurations for the pageset. Invalid configurations may be associated with a number of types of exception messages.

Output files (e.g., UI elements) are generated for the pagesets based on the data models. These output files may include input files for selectable attributes and results files for other attributes associated with items in the pageset. A contents list file is also provided and includes application-specific (as oppose to pageset-specific) data used to provide a navigation mechanism for the generated pagesets. The output files may be provided as XML documents, HTML files, or in some other format.

Prior to generating the data models, the item master and/or configuration variables may be validated, and error messages may be generated (and provided in a log file) for errors resulting from the validation process. The error messages may be used to "clean up" the item master and/or configuration variables, and the validation process may be iterated any number of times until valid data is obtained.

Another specific embodiment of the invention provides a method for forming a list of attributes for identifying items in a pageset. In accordance with the method, an attribute not yet considered for identifying the items in the pageset is initially selected. A determination is then made whether the selected attribute is useful for identifying the items in the pageset. If the attribute is useful, then it is included in the list. One or more additional attributes are then evaluated in similar manner, one attribute at a time, until a sufficient number of attributes is included in the list such that the items in the pageset are uniquely identified by their values for the attributes in the list. In one embodiment, only attributes that are common for all items in the pageset are considered for evaluation.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIG. 1 shows an example of an item master that lists the available items for an enterprise;

FIG. 3 shows various tables that may be generated for configuration-type data models, in accordance with an embodiment of the invention;

DESCRIPTION OF THE SPECIFIC EMBODIMENTS

Figure 2:
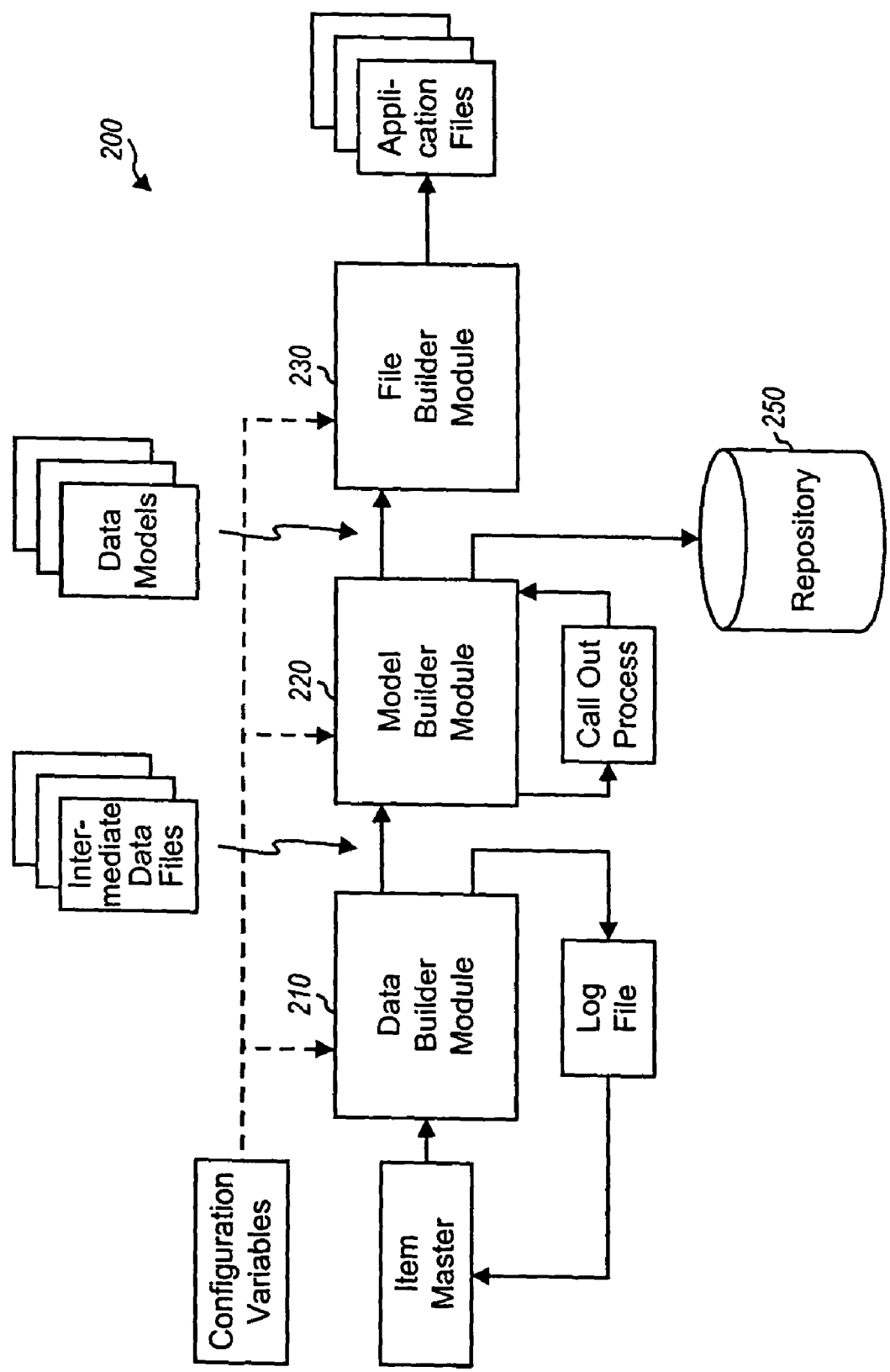
FIG. 2 is a diagram of an embodiment of a system capable of automatically generating data models for an item master.

FIG. 1 shows an example of an item master 100 that includes a collection of items (e.g., products) for an enterprise. Item master 100 (which may be implemented as a table) includes a number of rows and columns, with the specific number of rows and columns being dependent on the type and quantity of items being represented by the item master. The first row in the item master contains column headers, which identify the various attributes for the items in the table. Each subsequent row of the item master represents one record for one item. Each record includes information for the associated item, or more specifically the values for the attributes identified by the column headings. Thus, each column may be used to represent one specific attribute of the items, and each row may be used to represent one item.

In general, item master 100 may include information for any type of items that have attributes and which may be offered in a catalog context. For example, the items in the item master may represent products, services, solutions sets, employee relationship management (ERM)-based entities such as benefit documents, and other types of items. The item master may also be generated in various manners. In one embodiment, the item master may be generated manually (via key entry) and/or automatically (via a defined process) and is provided in a single data file. In another embodiment, the item master is generated from smaller tables in a relational database (i.e., a repository).

In the specific example shown in FIG. 1, item master 100 includes product data for a clothing enterprise. The first row in the item master contains column headers for the following attributes—ID, Gender, Type, Style, Size, Color, Price, and Item Number. Each subsequent row includes a record for one item and includes a set of values for the attributes identified by the column headers. For clarity, various aspects and embodiments of the invention are described for the example item master 100 shown in FIG. 1.

The item master may include a large listing for many items (e.g., hundreds or thousands of items). Presentation of the item master in the form shown in FIG. 1 may be cumbersome and unintelligible to an end-user (i.e., a user of a catalog application). For better presentation, the items may be classified into groups or "pagesets". Each pageset may be defined by a specific set of attribute values and may be viewed as corresponding to a particular product family. Each pageset may include one or more items having a first set of attribute values that match those used to define the pageset. In fact, this first set of attribute values is used to categorize the items in the item master into their proper pagesets. The items in each pageset are also associated with a second set of attribute values that may be used to uniquely identify the items in the pageset. Since all items in a given pageset have the same set of values for the attributes in the first set, "uniqueness" for the items in the pageset is achieved if each item in the pageset has a unique set of values for the second set of attributes (i.e., the set of values for the attributes in the second set for each item in the pageset is different from the sets of attribute values for all other items in the pageset). Uniqueness is described in further detail below.

In an embodiment and as shown in FIG. 1, item master 100 is defined to includes an identifier (ID) column 110, one or more Classification columns 120, one or more Candidate Attribute columns 130, and one or more Data Attribute columns 140. ID column 110 lists an item-specific identifier (e.g., an ID, SKU, or row ID) for each item in the item master. This identifier may not be unique for all items in the item master, but is unique for all items in any given pageset. The unique values for the identifier may be used to uniquely identify the items in each pageset. Classification columns 120 correspond to attributes used to classify the items in the item master into pagesets. Each pageset is defined by a unique set of classification column values and includes one or more items having the same set of attribute values used to classify the pageset. Candidate Attribute columns 130 correspond to attributes that may be selected and used to uniquely identify items within each pageset. The names of the Classification and Candidate Attribute columns generally conform to defined naming conventions for tables. Data Attribute columns 140 correspond to additional attributes of the items in the item master. These data attributes are generally used to provide additional descriptive information for the items and but are typically not used to identify the items in the pageset.

In the example shown in FIG. 1, the Classification columns includes the Gender and Type columns, the Candidate Attribute columns includes the Style, Size, and Color columns, and the Data Attribute columns include the Description (Desc), Price, Item Number, and Image columns.

Various implementations may be used to classify items in an item master, generate data-models, and further generate UI elements (i.e., run-time applications) based on the data models. In one family of implementations (referred to as "file-based"), preparation of the item master and specification of the attributes are mandatory steps (requiring interaction with an administrator, who may be tasked with building the catalog application), and run-time applications (e.g., in HTML files)

are generated based on the data models (e.g., using XLST). In another family of implementations (referred to as "repository-based"), preparation of the item master and specification of the attributes are optional steps and the data models are generated and saved to a repository. A publisher module (described below) may then be used to process (and possibly modify) the data models to generate the run-time application. A specific design for each of these two families of implementations is described below in FIGS. 2 and 7, respectively. Various other implementations can also be contemplated and are within the scope of the invention.

FIG. 2 is a diagram of a system 200 capable of automatically generating data models for an item master, in accordance with an embodiment of the invention. System 200 is an example of a file-based design, and is implemented as a software program that takes an item master as input and can generate data-dependent components of a catalog-type application. In this embodiment, system 200 (which is also referred to as a "catalog builder") includes a data builder module 210, a model builder module 220, and a file builder module 230.

Data builder module 210 receives the item master and a first set of configuration variables, validates the data in the item master, classifies items in the item master into pagesets, identifies which attributes are to used to identify the items in each pageset, and provides a set of intermediate data files. Data builder module 210 further provides status information indicative of the results of the processing on the item master and log information indicative of "uncleanliness" (i.e., errors) in the item master and/or errors in the configuration variables. The log information may be used to modify the configuration variables and/or the data in the item master (e.g., in an iterative manner) to provide valid data and variables.

Model builder module 220 receives the intermediate data files and a second set of configuration variables and generates data models. The data models may be provided in various forms such as, for example, XML documents, HTML files, formatted files or database tables that may be stored in a repository 250, and others. The XML documents contain pageset-specific data including the representation of the data models. A callout process may be inserted at a callout point in model builder module 220 and used to process and possibly modify (e.g., the XML version of) the data models before they are generated in final form, as described below.

File builder module 230 receives the data models (which may be provided in XML documents) and a third set of configuration variables and generates data-dependent application files. These application files either include or may be used to generate UI elements suitable for representing a catalog of the item master, as described below.

Each module executes on one or more input files and provides a set of output files. In an embodiment, user preferences for the operation of each module, such as directions for interpreting the item master, output format options, directories of the input and output files, and so on, are provided as configuration variables. The configuration variables for all three modules may be provided in various forms. In one implementation, the configuration variables are provided in a (global) configuration file. In another implementation, the configuration variables may be entered via a user interface screen that may be provided (e.g., for each module) to assist an administrator in the generation of the data models and UI elements.

These modules and their inputs and outputs are described in further details below.

Model builder module 220 may be designed to generate data models of various schemas. The specific schema to be used for the data models is dependent on various factors such as the data architecture employed, the specific design of a runtime engine that will process the data models to generate the required outputs, and so on. Various types if data models may also be generated such as, for example, configuration type and list type. The particular data model type to be generated may be specified in the configuration variables. For clarity, a specific schema for configuration-type data models is described below.

FIG. 3 shows various tables that may be generated for configuration-type data models, in accordance with an embodiment of the invention. In this embodiment, the configuration-type data models for each pageset include one or more Selectable Attribute feature tables 310, an Items feature table 320, a main configuration table 330, and a configuration sub-table 340. Additional, fewer, and/or different tables may also be provided for the configuration-type data models and are within the scope of the invention. The following description for the tables and sub-table is for a specific pageset (e.g., Woman's Pants).

For each pageset, a set of Selectable Attribute feature tables 310 is provided for the set of all "selectable" attributes used to uniquely identify the items in the pageset, with one Selectable Attribute feature table being provided for each selectable attribute. In the example shown in FIG. 3, all three candidate attributes are used as selectable attributes for the pageset. In this case, Style feature table 310*a*, Size feature table 310*b*, and Color feature table 310*c* are generated for the Style, Size, and Color selectable attributes, respectively. In a typical implementation, each Selectable Attribute feature table is named after the selectable attribute associated with and represented by the feature table.

Each Selectable Attribute feature table 310 provides a mapping of codes and their corresponding descriptions. The codes are used to represent the possible values for the associated selectable attribute, and the descriptions are texts that are more intelligible to the end-user. The codes are more efficient internal representations for the attribute values, and the description may be displayed in the UI elements for the end-user. Each Selectable Attribute feature table typically further provides an indication of which specific attribute value should be used as the default value for the associated selectable attribute, if none is specified.

In the embodiment shown in FIG. 3, each Selectable Attribute feature able 310 includes a Code column, a Description (Desc) column, and a Default column. In an embodiment, the values in the Code column are uniquely distinguishable text string. In an embodiment, the code values are numeric and sequentially numbered (e.g., starting from 0). These code values correspond to all possible values for the associated selectable attribute for the given pageset (and not for the entire item master). The Description column includes values drawn from the column of the item master corresponding to the selectable attribute being represented by the feature table. As an example, for the Style feature table 310*a*, code values of 0, 1, 2; and 3 are used to represent the possible styles of Dress, Casual, Twill, and Jean, respectively, for the pageset for Woman's Pant. The Default column includes an indication of which value should be used as the default (e.g., Casual is the default for the Style selectable attribute for this pageset).

Items feature table 320 includes item-specific information, and may be used to provide additional information not included in the Selectable Attribute feature tables. In an embodiment, the Items feature table includes a Code column, a Description (Desc) column, an ID column, a Price column, an Item Number column, an Image column, a Default column, and zero or more additional columns. The Code column includes distinguishable values used to represent a key referenced by an Items column of configuration sub-table 340. The Description, ID, Price, Item Number, and Image columns each includes the values drawn from the corresponding column in the item master, and these columns may also be specified in the configuration variables. The Default column includes an indication of which row value should be used as the default for the Description column.

Additional columns may be added to Items feature table 320, e.g., by specifying these columns in the configuration variables. Each additional column (if any) is typically named after the corresponding specified column in the item master, and includes data drawn from that specified column. In the example shown in FIG. 3, the Price, Item Number, and Image columns are added to the Items feature table and these columns include the values drawn from the Price, Item Number, and Image columns in the item master.

Items feature table 320 includes one row for each item in the pageset. For each item, the values for the columns in the Items feature table are drawn from the corresponding columns in the item master.

Main configuration table 330 identifies valid and invalid configurations for the selectable attributes in the pageset. Each pageset is associated with a set of selectable attributes, and each selectable attribute is further associated with a set of possible values. The permutation of all possible combinations of values for these selectable attributes would represent all possible items that may be included in the pageset. However, a given pageset typically includes only a subset of all possible items. Each item actually included in the pageset represents a valid combination (i.e., a valid configuration) in the main configuration table, and items not included in the pageset are invalid combinations that are represented as "exceptions" in the configuration table.

In the embodiment shown in FIG. 3, main configuration table 330 references configuration sub-table 340 for the valid and invalid configurations and includes a Sub-table column and a Rule column. The Sub-table column includes the name of the configuration sub-table that may be referenced to determine valid and invalid configurations for the pageset. The Sub-table column is also referred to as a "type-99" column since it references to another sub-table. In this example, the name of the configuration sub-table being referenced is "Attribute_Check". The Rule column may include rules that may be used to cross reference some other information, e.g., exception messages.

Configuration sub-table 340 identifies the valid and invalid configurations for the pageset. These configurations may be represented in numerous ways, with the more efficient representation being dependent on the specific data in the pageset. In one simple implementation, the configuration sub-table may include one entry (i.e., one row) for each possible configuration, with the valid configurations being grouped into one row set and the invalid configurations being grouped into another row set. For many pagesets, the number of valid configurations may represent only a small subset of all possible configurations, the number of invalid configurations may be large, and it may not be efficient to list each invalid configuration with its own row in the configuration sub-table. Techniques to more efficiently represent invalid configurations are described below.

In the embodiment shown in FIG. 3, configuration sub-table 340 includes one column for each selectable attribute for the pageset (e.g., Style, Size, and Color columns), the Items column for Items feature table 320, and zero or more additional columns. For efficiency, the configuration sub-table typically uses code values to represent the configurations. Thus, each Selectable Attribute column (which is also referred to as a "type-1" column) refers to a corresponding Selectable Attribute feature table. The Items column (which is also referred to as a "type-0" column since it does not refer to another table) includes data drawn from a specified column in the Items feature table. Each additional column (if any) includes either fixed text or data drawn from a specified column in the item master.

As shown in FIG. 3, configuration sub-table 340 includes a Data row set that lists valid configurations for the pageset and an Exception row set that lists invalid configurations. The valid and invalid configurations may be determined as described below.

The list-type data models may include Items feature table 320 and main configuration table 330. Additional, fewer, and/or different tables may also be provided for the list-type data models and are within the scope of the invention. The main configuration table uses the Items feature table as a single type-1 column with a value of "*" in the data cell (i.e., match all the rows from the Item feature table).

FIG. 3 shows one specific design for the data models, which may be used to generate catalog applications. Various other designs for the data models may also be implemented and are within the scope of the invention. For example, a data model design that may also be used is described in European Patent Application Serial No. 99309178.4, entitled "Method and Apparatus for Interpreting User Selections in the Context of a Relation Distributed as a Set of Orthogonalized Sub-Relations," filed Nov. 18, 1999, assigned to the assignee of the present application and incorporated herein by reference. In general, any type of data models having attribute-to-UI relationships may be used in conjunction with the techniques described herein. Moreover, these data models need not be implemented with tables.

Referring back to FIG. 2, data builder module 210 receives the item master and the first set of configuration variables and provides a set of intermediate data files for model builder module 220. The item master may be in the form shown in FIG. 1 and is typically provided in a single data file. The configuration variables for data builder module 210 may include the following information:

Item master file name—identifies the particular file that includes the item master to be operated on by data builder module 210.

ID column name—identifies the ID column in the item master.

List of classification columns—the attributes corresponding to these columns are used to group the items in the item master into pagesets.

List of candidate columns—the attributes corresponding to these columns may be selected and used to uniquely identify the items in each pageset.

List of data attribute columns—the attributes corresponding to these columns may be used to further describe the items in the item master.

Columns that are trigger-target pairs—an attribute may be used as a trigger for another attribute. For example, different sets of sizes for pants may be applicable for different styles of pants. In this case, the style attribute is used as a trigger to determine the proper set of sizes for that style of pant.

Columns that will be added to the Items feature table—identifies the columns in the item master that will be added to the Items feature table.

Directory path for the log and intermediate data files—identifies the location where the log and intermediate data files are to be saved.

Toggle for auto-conversion of single-widget data models to list-type—

The configuration variables for data builder module 210 listed above are for a specific implementation. For other implementations, the configuration variables may include additional, fewer, and/or different information than that listed above, and this is within the scope of the invention.

Figure 4A:
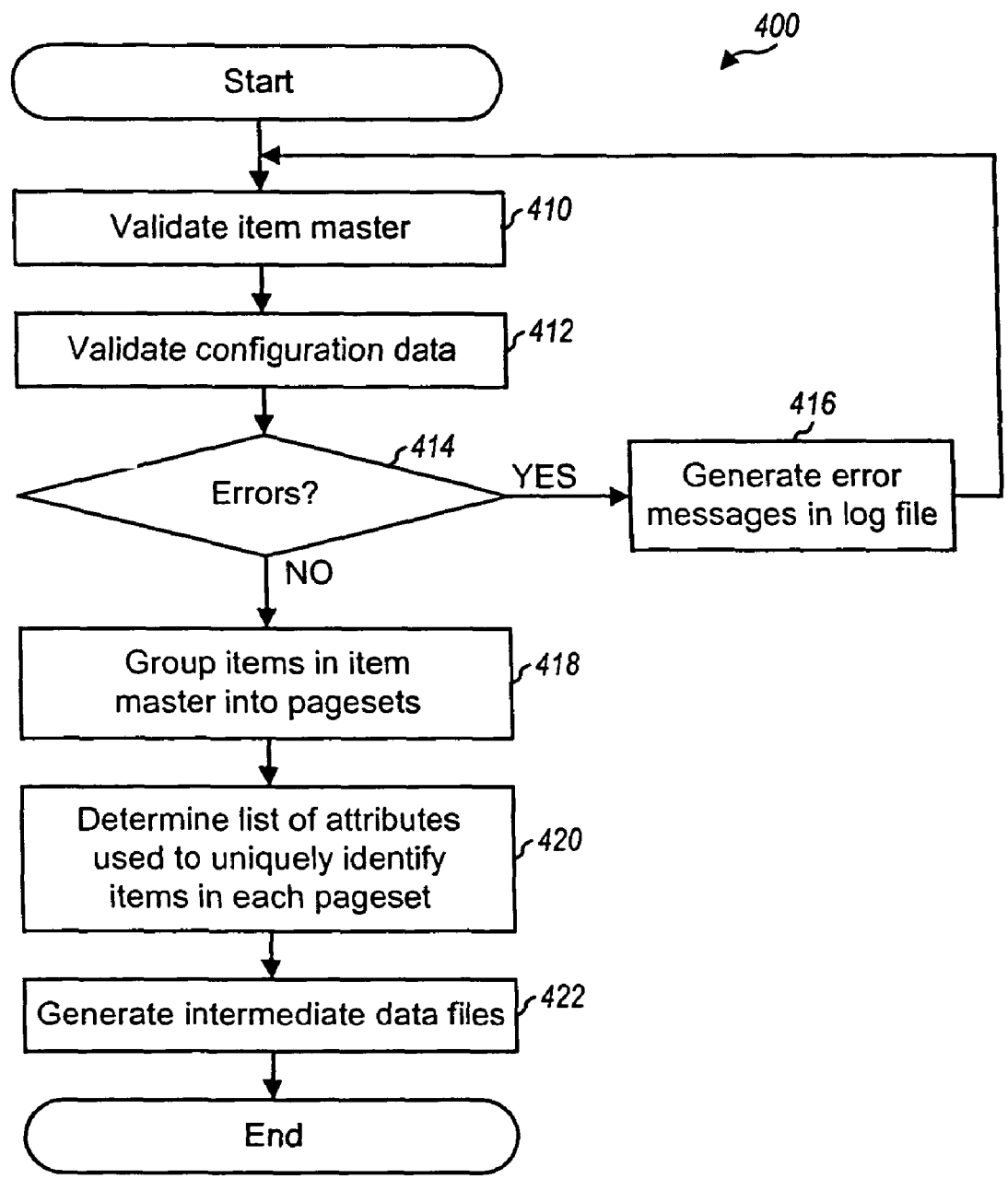
FIG. 4A is a flow diagram of an embodiment of a process performed by a data builder module to generate a set of intermediate data files from the item master.

FIG. 4A is a flow diagram of an embodiment of a process 400 performed by data builder module 210 to generate the intermediate data files from the item master. Initially, the item master is validated to identify any "uncleanliness" in the data that would prevent the generation of complete data models for the item master, at step 410. This validation may entail checking the item master to ensure that (1) no two rows have duplicate data, (2) the attributes for the Classification and Candidate Attribute columns are not blank (i.e., no empty strings), and so on. The configuration data may also be validated, at step 412. If any errors in the item master and/or configuration data are encountered, as determined in step 414, then error messages are generated and included in a log file that is made available to the administrator, at step 416. Via the log file, the administrator is informed of the errors and can clean up the input data. Steps 410 through 416 may be iteratively performed until the data in the item master and the configuration data are validated.

Once the data is validated, data builder module 210 groups the items in the item master into pagesets, at step 418. This is achieved based on the attribute values in the Classification columns identified by the configuration variables. In particular, each unique set of attribute values for the Classification columns is associated with a separate pageset. All items in the item master having the same set of attribute values for the Classification columns are grouped into the same pageset.

The grouping of the items in the item master into pagesets may be performed by traversing the item master, one record at a time. For each record, the Classification column values are determined. If this set of values is unique, then a new pageset is defined and the record is grouped into that pageset. Otherwise, the record is grouped into a pageset previously defined for another item in the item master. A column may be provided in the item master to mark the particular pageset to which each item belongs.

Table 100 in FIG. 1 shows an example of the grouping of the items into pagesets. The number of pagesets is equal to the number of unique sets of classification column values.

Once the items in the item master are grouped into pagesets, data builder module 210 identifies a list of attributes that may be used to uniquely identify the items in each pageset, at step 420. These attributes are referred to as selectable attributes. In an embodiment, one set of selectable attributes is provided for each pageset, and different pagesets may be associated with different sets of selectable attributes. The selectable attributes are chosen from those associated with the Candidate Attribute columns identified in the configuration variables. The selectable attributes for each pageset may be determined as described below in FIG. 4B.

Data builder module 210 then generates output files based on the pageset data, at step 422. In an embodiment, these files include (1) a verbose log file that may be used to provide information, warning, error, and so on, which may be provided as feedback to an administrator regarding the quality of the data, (2) a status file that lists all pagesets to be generated, the pageset name, items, selectable attributes, and data model type, and (3) a set of intermediate data files to be used by model builder module 220 to generate data models. Additional, fewer, and/or different output files may also be generated and are within the scope of the invention. The processing by data builder module 210 then terminates.

In an embodiment, the configuration variables identify a list of Candidate Attribute columns, and the attributes corresponding to these columns (which are also referred to as candidate attributes) may be selected and used to uniquely identify the items in each pageset. For each pageset, a (minimum) number of candidate attributes may be selected (which are then referred to as selectable attributes) such that each item in the pageset may be uniquely identified based on these selected attributes. Since each of these selected attributes may also be selected (i.e., configured with a value) by the end-user via the catalog application (e.g., a UI screen), they are also referred to as selectable attributes. The designation of the attributes in the item master as candidate attributes and/or the selection of the candidate attributes as selectable attributes may be made by the administrator (e.g., specified via the configuration variables), automatically by data builder module 210, or a combination of both.

In an embodiment, the candidate attributes are grouped into two categories labeled as "mandatory" and "optional". Mandatory attributes are those attributes designated by the administrator to be used as selectable attributes (and may or may not be helpful in determining uniqueness among items in a pageset). Optional attributes are those that may be selected for use to uniquely identify items if the mandatory attributes are not sufficient to determine uniqueness. The designation of each candidate attribute as either mandatory or optional may be made by the administrator or via another means.

In an embodiment, the optional attributes are provided in an ordered list, and these attributes are thereafter selected for use to determine uniqueness, one at a time and as needed, based on their order in the list. Thus, the first optional attribute in the list is considered first to determine whether or not it is useful for item identification, the second optional attribute in the list is considered next, and so on, and the last optional attribute in the list is considered last.

Figure 4B:
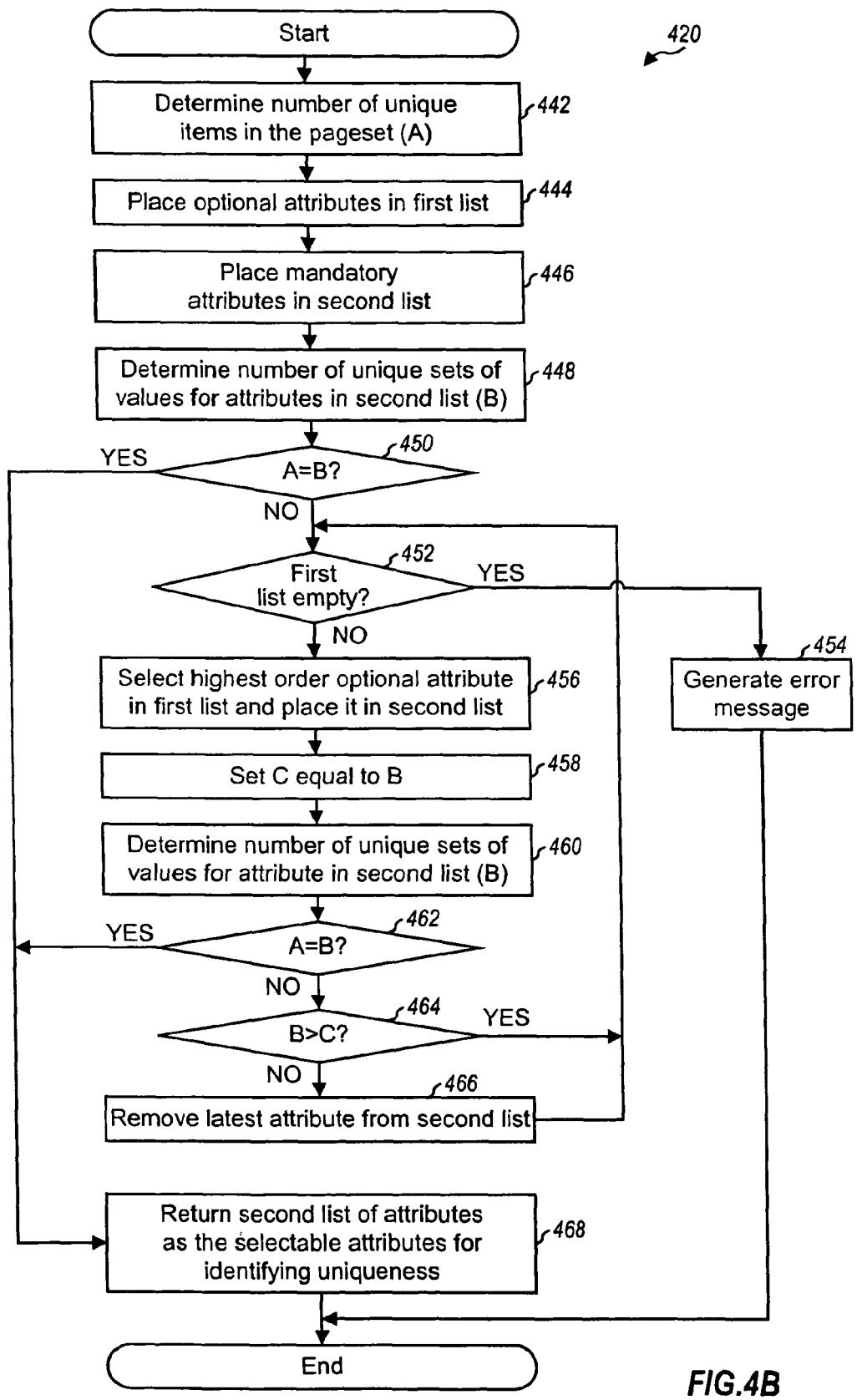
FIGS. 4B and 4C are flow diagrams of two embodiments of a process to determine a list of selectable attributes that may be used to uniquely identify the items in each pageset.

FIG. 4B is a flow diagram of an embodiment of a process 420 to determine a list of selectable attributes that may be used to uniquely identify the items in each pageset. Initially, the number of unique items in the pageset is determined, at step 442. This may be achieved by simply counting the number of items in the item master belonging to the pageset being processed. This number is denoted as "A".

The optional attributes are then placed in a first list in the order specified in the configuration variables, at step 444. These optional attributes may be considered, one at a time if necessary and in the order in which they are placed on the first list, to determine uniqueness. The mandatory attributes (if any) are placed in a second list, at step 446. The number of sets of unique values for the attributes in the second list is then determined, at step 448. This number is denoted as "B".

A determination is then made whether the number of unique attribute value sets is equal to the number of unique items in the pageset (i.e., whether A=B), at step 450. If these numbers are equal, indicating that the mandatory attributes in the second list are sufficient to uniquely identify the items in the pageset, then the process proceeds to step 468. Otherwise, if the mandatory attributes are not sufficient to determine uniqueness, the optional attributes are considered, one by one, until a sufficient number of optional attributes is included to specify item uniqueness.

The consideration of the optional attributes begins in step 452, where a determination is made whether the first list of optional attributes is empty. If the first list is empty, then an error message may be generated in the log file, at step 454, and the process terminates. Otherwise, if the first list is empty, then the highest order optional attribute in the first list is selected for consideration and placed in the second list, at step 456. The current value of B is then saved as C, in step 458, and the number of sets of unique values for the attributes in the second list is determined and saved as the new value of B, at step 460.

A determination is then made whether the number of unique attribute value sets is equal to the number of unique items in the pageset (i.e., whether A=B), at step 462. If these numbers are equal, indicating that the mandatory and optional attributes in the second list are sufficient to uniquely identify the items in the pageset, then the process proceeds to step 468.

If B is not equal to A at step 462, then a determination is made whether the number of unique attribute value sets with the latest optional attribute is greater than the number of unique attribute value sets without the latest optional attribute (i.e., whether B>C), at step 464. If B is not greater than C, indicating that the latest optional attribute was not useful in determining uniqueness, then this attribute is removed from the second list, at step 466. Otherwise, the optional attribute is retained in the second list. In either case, the process then returns to step 452 to consider the next optional attribute.

At step 468, since the number of unique attribute value sets is equal to the number of unique items in the pageset, the second list is provided as the list of selectable attributes that may be used to specify item uniqueness for the pageset. The process then terminates.

Figure 4C:
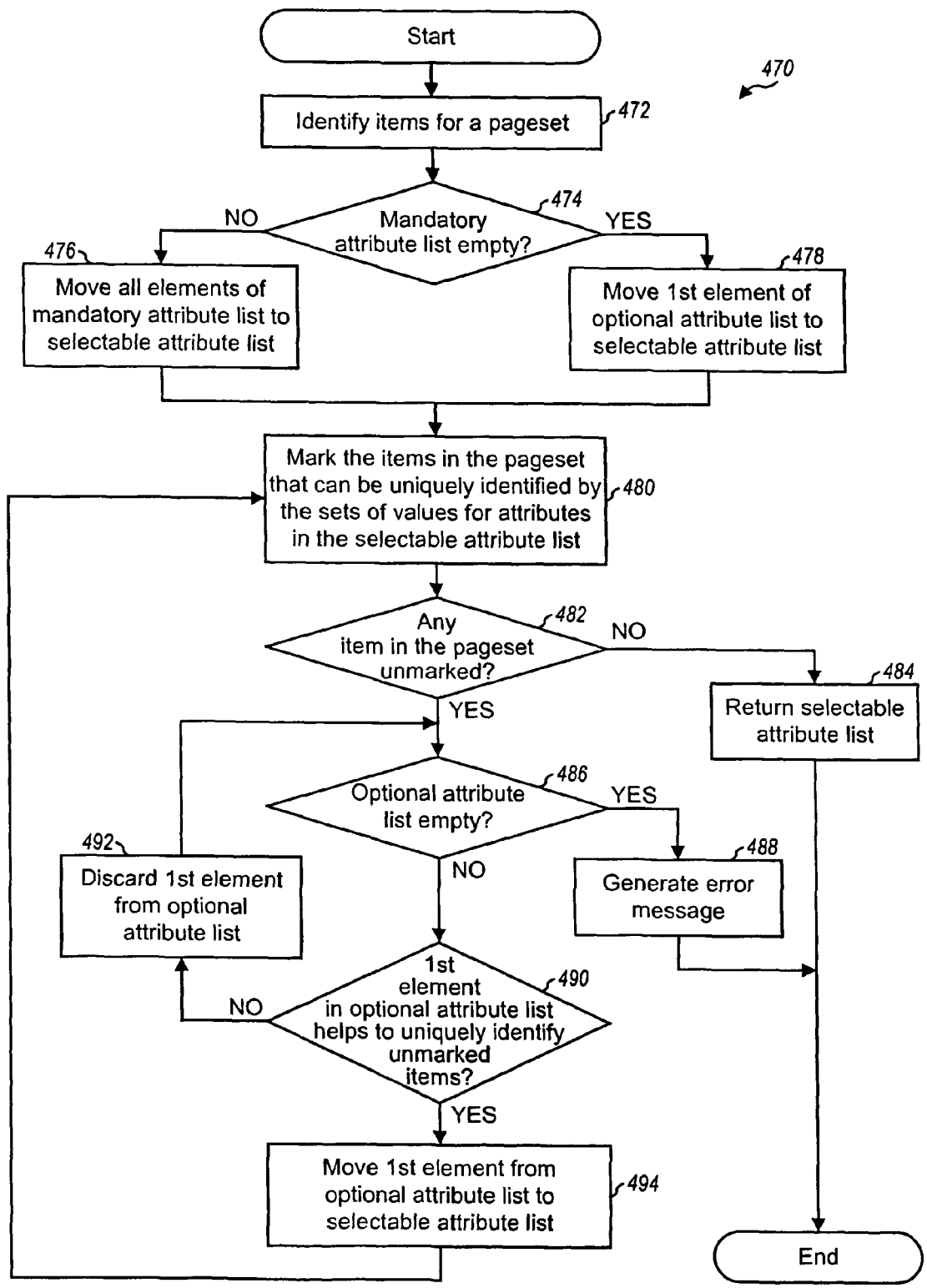

FIG. 4C is a flow diagram of another embodiment of a process 470 to determine a list of selectable attributes. Initially, the items for a particular pageset to be processed are identified, at step 472. A determination is then made whether or not a list of mandatory attributes is empty, at step 474. If this list is not empty, then all mandatory attributes are moved to the selectable attribute list, at step 476. Otherwise, the first element of a list of optional attributes is moved to the selectable attribute list, at step 478.

The items in the pageset that can be uniquely identified by the sets of values for the attributes in the selectable attribute list are then marked, at step 480. A determination is then made whether there are any unmarked items in the pageset, at step 482. If all items are marked, then the selectable attribute list is returned as the list of selectable attributes that may be used to specify item uniqueness for the pageset, at step 484. The process then terminates.

Otherwise, if there is any unmarked item in the pageset, a determination is made whether or not the optional attribute list is empty, at step 486. If the optional attribute list is empty, then an error message may be generated in the log file, at step 488, and the process terminates. And if the optional attribute list is not empty, then a determination is made whether adding the first element of the optional attribute list to the selectable attribute list would help to uniquely identify the unmarked items in the pageset, at step 490. If the answer is no, then the first element of the optional attribute list is discarded, at step 492. Otherwise, the first element of the optional attribute list is moved to the selectable attribute list, at step 494, and the process returns to step 480.

The process shown in FIG. 4B or 4C may be executed for each pageset in the item master and provides a list of selectable attributes that may be used to determine uniqueness for each pageset. In the embodiment shown, the minimum number of selectable attributes is provided for each pageset, since optional attributes that do not contribute to item identification are removed. Moreover, the attributes to be considered and their order for consideration may be specified (e.g., by the administrator via the configuration variables) or may be automatically determined (e.g., by data builder module 210).

The process to select attributes to specify item uniqueness results in the creation of configuration-type data models. A particular combination of Classification column values may also be specified to generate list-type data models. Configuration-type data models may also be automatically converted into list-type data models (list-type data models may be generated from the item master) via a parameter value in the first set of configuration variables provided to data builder module 210. This process of selecting selectable attributes, which creates configuration-type data models, may be overridden in the configuration file by specifying that a particular combination of classification column values should generate list-type data models instead. The administrator may also select to automatically convert configuration-type data models that contain only one selectable attribute into list-type data models.

Model builder module 220 receives the set of intermediate data files from data builder module 210 and the second set of configuration variables and generates data models that may be provided to file builder module 230 and/or stored to repository 250. The data models are provided in one or more formats which may be specified (e.g., via the configuration variables). The configuration variables for model builder module 220 may include the following information:

Output format—XML, HTML, repository, or a combination thereof
Overwrite existing data models—true or false
Directory path for the log file
Directory containing the intermediate data files
Gateway repository project name (if saving to the repository)
Gateway database connect string (if saving to the repository)
HTML file destination directory (if using HTML)
Backup HTML files (if using HTML)—true or false
XML output directory
Backup XML files—true or false
Callout process (optional)

The configuration variables for model builder module 220 listed above are for a specific implementation. For other implementations, the configuration variables may include additional, fewer, and/or different information than those listed above, and this is within the scope of the invention.

Figure 5A:
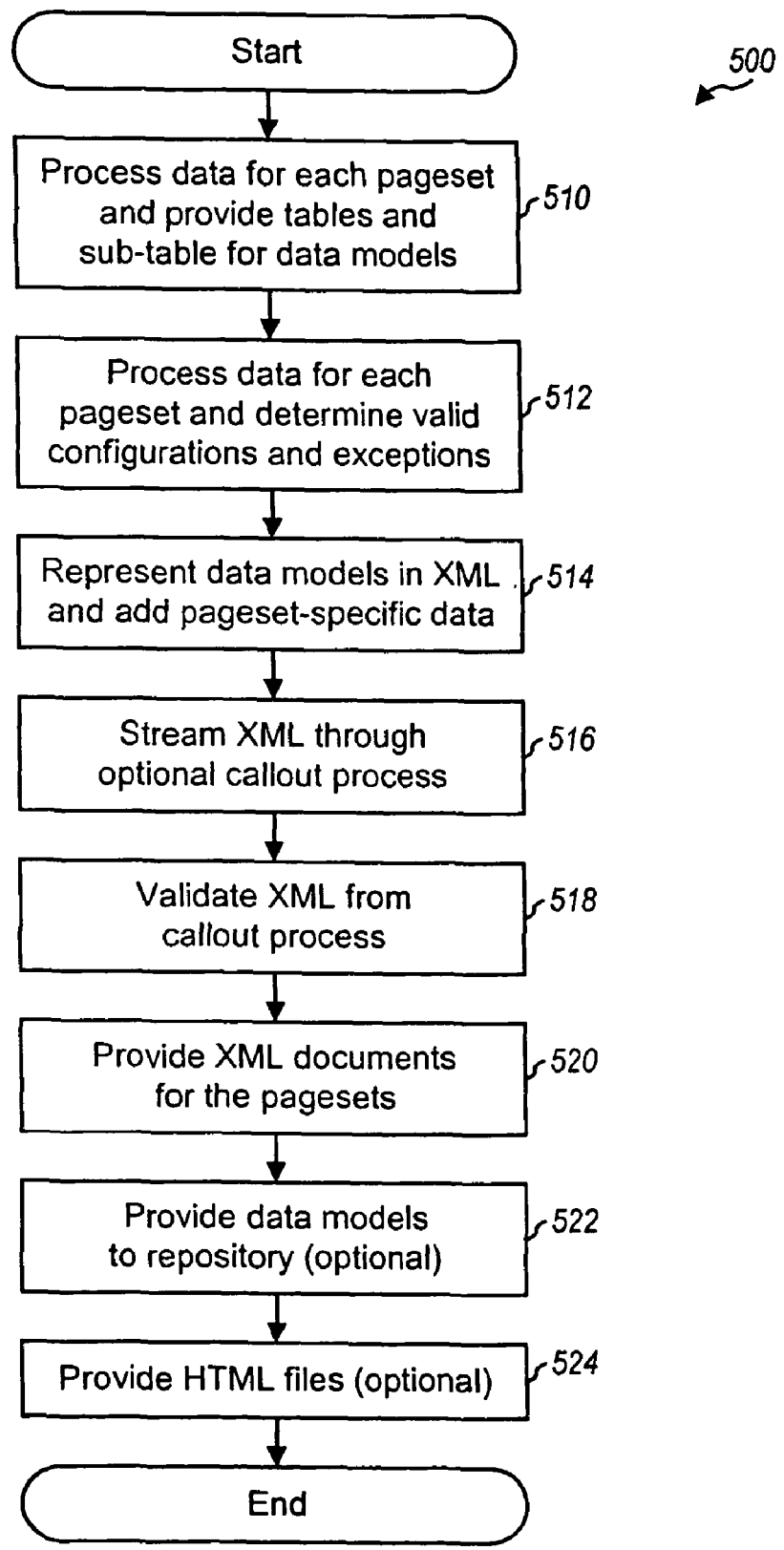
FIG. 5A is a flow diagram of an embodiment of a process performed by a model builder module to generate data models for each pageset.

FIG. 5A is a flow diagram of an embodiment of a process 500 performed by model builder module 220. Initially, model builder module 220 processes the data for each pageset to generate a set of tables and sub-table for the data models, as shown in FIG. 3, at step 510. Model builder module 220 then identifies valid configurations and generates exceptions for each pageset, at step 512. Exception messages may be generated to identify invalid configurations, and these messages may be generated by passing the pageset data through several "methods" in sequential order, as described below in FIG. 5B.

Model builder module 220 then represents the data models, e.g., in XML and adds to this XML other pageset-specific data, at step 514. The pageset-specific data includes raw data from the item master and information generated by data builder module 210 such as which attributes are mandatory and which are optional.

In an embodiment, model builder module 220 supports the inclusion of an optional administrator-specified callout process to be applied to the data models. Via the callout process, the administrator is able to examine and modify the data models before hey are provided in final output form. If the data models are provided as XML pagesets, as for the embodiment described herein, the callout processes are designed with the capability to operate on streamed XML as both input and output. Any number of processes may be used as the in-line callout process.

Thus, the XML may be passed streaming through an optional callout process, at step 516. After streaming through the callout process, the XML may be validated before the final data models are generated, at step 518. Model builder module 220 then provides the optionally modified and validated XML representation for each pageset in one or more output forms, which may be specified by the administrator via the configuration variables.

First, XML documents may be created (e.g., as specified by the configuration variables and/or as the default form), at step 520. In this case, one XML document is provided for each pageset, with the XML document containing the data models and other pageset-specific information such as data for the pageset items obtained from the item master. A master XML document containing application-specific data (as opposed to pageset-specific data) and references to all of the pageset documents is also created and provided. This master XML document may be used to generate the contents list for the item master, as described below. Second, the data models may optionally be provided to repository 250, at step 522. Third, the data models may optionally be used directly to generate HTML files (*_00.htm and *_m.htm files), at step 524. The HTML files may be read directly by a runtime engine, which can allow for rapid generation of pageset screens. However, the data models in HTML form may not be easily modified by a subsequent process.

Figures 5B, 6:
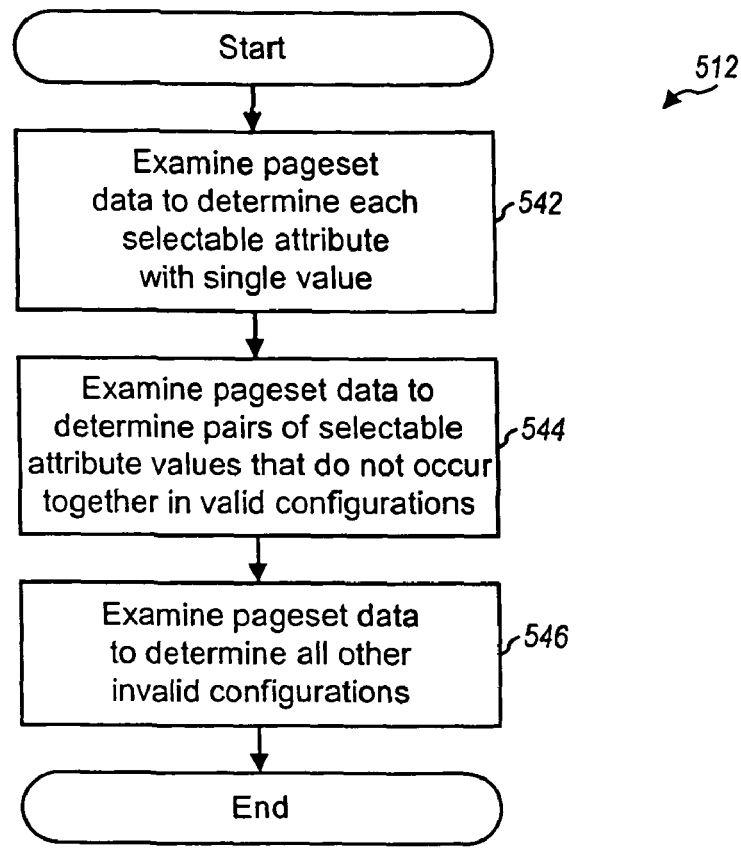
FIG. 5B is a flow diagram of an embodiment of a process to examine the data for each pageset to generate exception messages for invalid configurations.
FIG. 6 shows an embodiment of a screen capable of presenting items in the item master using application files generated from the data models.

FIG. 5B is a flow diagram of an embodiment of a process to examine the data for each pageset to generate exception messages for invalid configurations. In an embodiment, logical guidance for generating the exception messages is derived from the pageset data itself. Various types of exception messages may be generated for invalid configurations. These data-dependent exception messages can greatly reduce the number of messages that needs to be generated and further reduce the number of entries needed to represent invalid configurations in the configuration sub-table.

Initially, the pageset data is examined to identify any selectable attribute that has only one value (i.e., the attribute value occurs only once in the valid configurations for the pageset), at step 542. For each such attribute value, a first type of exception message may be generated such as, e.g., "[selectable attribute value] is only available with [list of other selectable attribute values an item is available with]." Next, the pageset data is examined to identify any pair of selectable attribute values that do not occur together in a valid configuration (e.g., red dress), at step 544. For each such attribute pair, a second type of exception message may be generated such as, e.g., "[attribute 1 value] is not available with [attribute 2 value]". The first two types of exception messages are thus effectively generated from valid configurations. Typically, the first two types of exception messages cover a large percentage of all invalid configurations. Finally, the pageset data is examined to identify all remaining invalid configurations, at step 546. For each such invalid configuration, a third type of exception message may be generated such as, e.g., "[the combination of selected attribute values is an invalid configuration]."

Each of the steps described above may be performed via a respective method. The exception messages may also be provided in a log file that is provided by model builder module 220. The log file provides result of the data modeling so that the administrator can review the result.

File builder module 230 receives the data models (e.g., the XML documents) from model builder module 220 and the third set of configuration variables and generates data-dependent application files. The configuration variables for file builder module 230 may include the following information:

Path of the executable for a Xalan XSL processor
Directory for XML documents
Directory for the log file output
For each XSLT stylesheet to be used:
  Stylesheet name
  Directory for stylesheet output
  Backup stylesheet output—true or false The configuration variables for file builder module 230 listed above are for a specific implementation. For other implementations, the configuration variables may include additional, fewer, and/or different information than those listed above, and this is within the scope of the invention.

File builder module 230 generates application files from the received XML documents. In an embodiment, these application files include a Contents List page, one or more Inputs pages, and one or more Output pages. The application files may either include or be used to generate UI elements suitable for representing the item master.

The Contents List page is generated from the attributes corresponding to the Classification columns in the item master and are used to provide a hierarchical tree of the pagesets for the item master. The hierarchical tree may include any number of levels, with one level being provided for each classification column. For the example shown in FIGS. 1 and 3, the first level may be Gender and the second level may be Type. The Contents List page provides a means for an end-user to navigate through the item master to arrive at the desired pageset.

The Input pages represent the selectable attributes and are generated based on the Selectable Attribute feature tables, the main configuration table, and the configuration sub-table. Typically, one Input page is generated per pageset, and each Input page includes all selectable attributes for the pageset. Upon selection of a particular pageset by the end-user, the Input page for the selected pageset may be displayed. Depending on the specific implementation, the Input page may allows the end-user to view all valid configurations for the pageset, or may allow the end-user to select a particular configuration and respond whether the selected configuration is valid or invalid. The Input pages reference the Selectable Attribute feature tables.

The Output pages represent the additional data for the items in each pageset. This data may include the data in the Data Attribute columns in the item master (e.g., the Price, Item Number, and Image columns in the item master shown in FIG. 1). The data in the Output pages may be presented in various manners. In one implementation, upon selection of a particular valid configuration via the Input page, the additional data corresponding to the selected configuration is retrieved from the Output page and presented to the end-user.

FIG. 6 shows an embodiment of a screen 600 capable of presenting items in the item master. In this embodiment, the screen includes three frames 610, 620, and 630 generated from the application files and used to display the Contents List page, the Input page, and Output page, respectively.

The Contents List page is rendered in frame 610, via which the end-user is able to navigate through various classification attributes to arrive at the desired pageset. In the example shown, the classification attributes are presented via a hierarchical tree structure, with the Gender level including two choices (Woman and Man) and each Gender choice further including a number of choices. In another implementation, the classification attributes may also be represented with a set of list boxes, one list box for each classification attribute, with each list box including the possible choices for the classification attribute. The values in each classification attribute list box may be dependent on the values selected for other classification attributes. The specific set of values selected for all classification attributes directs the end-user to the associated pageset.

The Input page for the selected pageset is rendered in frame 620, which provides the list of selectable attributes. In an embodiment, the default values are populated in the list boxes for the selectable attributes. In an embodiment, a specific value may be selected for each selectable attribute (e.g., to override the default value). Upon selection of a specific set of values for all selectable attributes, the configuration corresponding to this specific set of values may be checked as to determine whether it is valid or invalid. For example, the end-user may select the configuration of a blue, size 2, dress pant. If the configuration is valid, the Output page for the selected configuration is displayed in frame 630. For the above example, the additional data for the selected configuration may include the price of $59.95 and the item number of 128. Otherwise, if the configuration is not valid, the appropriate exception message may be displayed, e.g., in frame 630.

The application files may be generated based on a particular template. The use of the template allows for flexibility in creating both the contents and the data-based logic of the application files.

The template may be provided via a file, specified via a user interface screen, or provided via some other means. Default templates may be provided and used for creating the application files. The templates may be modified (or customized) to suit the specific application design.

In one specific implementation, the templates comprise XSLT (Extensible Style Language Transformations) stylesheets. In this implementation, file builder module 230 includes runtime Java and a Java-based Xalan XSL (Extensible Style Language) processor, which is publicly available. The Xalan XSL processor is a particular implementation of XSL transformation, and is used to convert XML documents to other types of documents such as XML, HTML, PDF, and possibly others. Other types of templates may also be defined and used and are within the scope of the invention. For example, File builder module 230 further provides a log file that provides information for the administrator.

System 200 may be launched to execute the data, model, and file modules in the proper sequential order. The execution may be initiated via a single batch file, which is a "wrapper" script. The wrapper script may receive a configuration variable indicating a starting point module and starts execution from this starting point module. The starting point may be data builder module 210, model builder module 220, or file builder module 230. In this way, the administrator is able to run only the desired module(s) of system 200, e.g., those that have not yet been run.

Figure 7:
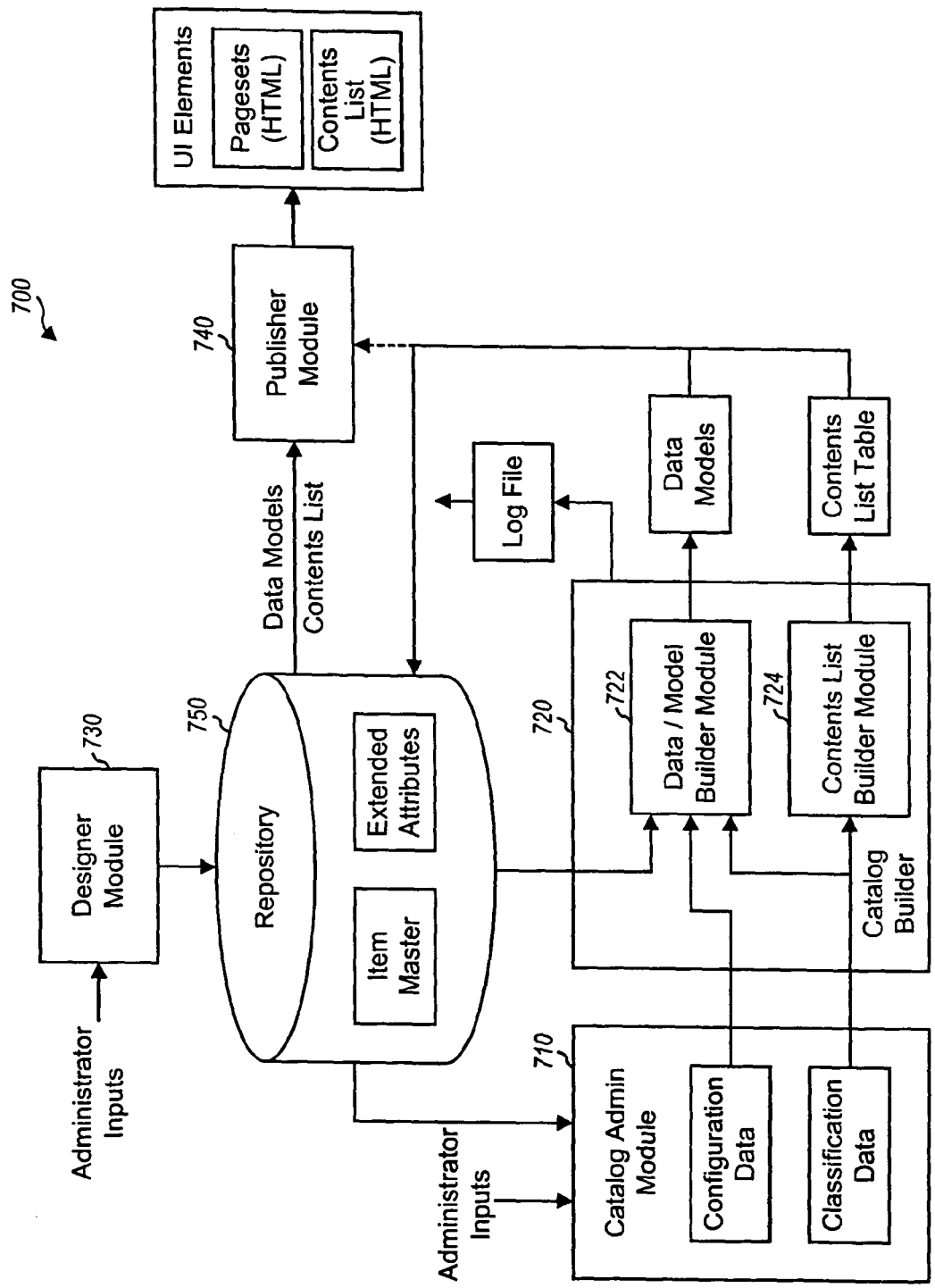
FIG. 7 is a diagram of another embodiment of a system capable of automatically generating data models using items stored in a repository.

FIG. 7 is a diagram of a system 700 capable of automatically generating data models using items stored in a repository, in accordance with another embodiment of the invention. System 700 an example of a repository-based design, and also takes an item master as input and can generate data-dependent components of a catalog-type application. In this embodiment, system 700 includes a catalog admin module 710, a catalog builder module 720, a designer module 730, and a publisher module 740. Catalog builder module 720 further includes a data/model builder module 722 and a contents list builder module 724. A database 750 provides the data for system 700 and further stores the data models generated by system 700.

The item master from the database may be comprised of a number of smaller tables that may be represented using any number of (relational) database schema. In that case, the collection of all attributes for the items in the item master may not apply to each item (i.e., not all items in the item master may be associated with all of the attributes). In an embodiment, only attributes that are common to all items in the item master are considered for use as classification attributes, and only attributes that are common to all items in each pageset are considered for use as candidate attributes for that pageset. Other attributes that apply to only some of the items in the item master would then be designated as data attributes.

Catalog admin module 710 receives the item master and possibly other data from database 750 and provides classification and configuration data. In an embodiment, all or a subset of the common attributes for the item master may be presented to an administrator (e.g., via a screen), who may then select a set of these common attributes to classify the item master. This allows the administrator to categorize the item master and define pagesets in any desired manner. This first set of attributes comprises the classification data for the item master. The classification data is then provided to data/model builder module 722 and used to classify the items in the item master into pagesets, as described above. The classification data is also provided to contents list builder module 724 and used to generate a Contents List table.

In an embodiment, all or a subset of the common attributes (which are not classification attributes) for each pageset may also be presented to the administrator, who may then select a set of these attributes as candidate attributes for the pageset. The administrator may also define configuration variables (e.g., such as those described above) via catalog admin module 710.

Within catalog builder module 720, data/model builder module 722 receives (1) the item master and possibly extended attributes for the items in the item master from database 750, (2) the classification data from catalog admin module 710, and (3) configuration data, which may be provided via a file and/or by catalog admin module 710. Data/model builder module 722 performs many of the functions described above for data builder module 210 and model builder module 220. Data/model builder module 722 may first generate an item master (on the fly) similar to that shown in FIG. 1 if the data/model builder module is provided with a collection of smaller "normalized" tables that collectively defines the Products table. A normalized table is typically provided for each attribute (e.g., color, size). The use of normalized tables may reduce the amount of redundancy (i.e., without normalization, many combinations of redundant information may be present).

Data/model builder module 722 then classify the items in the item master into pagesets using the classification data, and further generates data models for each pageset using the candidate attributes and configuration data. The candidate attributes may be provided by catalog admin module 710, via the configuration data, and/or derived from the extended attributes by data/model builder module 722. In an embodiment and as described above, the data models for each pageset may include a set of feature tables, a main configuration table, and a configuration sub-table. These tables and sub-table may be generated as described above in FIG. 3. The data models may be stored back to database 750, or may be provided directly to publisher module 740.

Contents list builder module 724 receives the classification data and generates a Contents List table, which may be used for navigation through the item master as described above. The Contents List table may also be stored back to database 750, or may be provided directly to publisher module 740.

Catalog builder module 720 may also provide a log file, which may include error messages indicating any uncleaniness in the received item master and/or the configuration data. The information provided in the log file may be used to clean the item master (e.g., modify item values and/or attributes), the configuration data, and/or the classification data, such that valid data models may be generated.

Designer module 730 provides graphical user interface (GUI) tools to assist the administrator manually perform data modeling, create attributes, select default, and perform other functions. Designer module may be used to further modify or customize data model and/or content list that are generated by catalog builder module 720. Designer module 730 may also be used to publish the result of the data modeling.

Publisher module 740 receives the data models and the Contents List table from database 750 and generates UI elements suitable for display on a screen. In an embodiment, publisher module 740 generates a Contents List page based on the Contents List table and a number of pagesets based on the data models. These contents list page and pagesets may be presented as HTML files or in some other format.

Computer System

Figure 8:
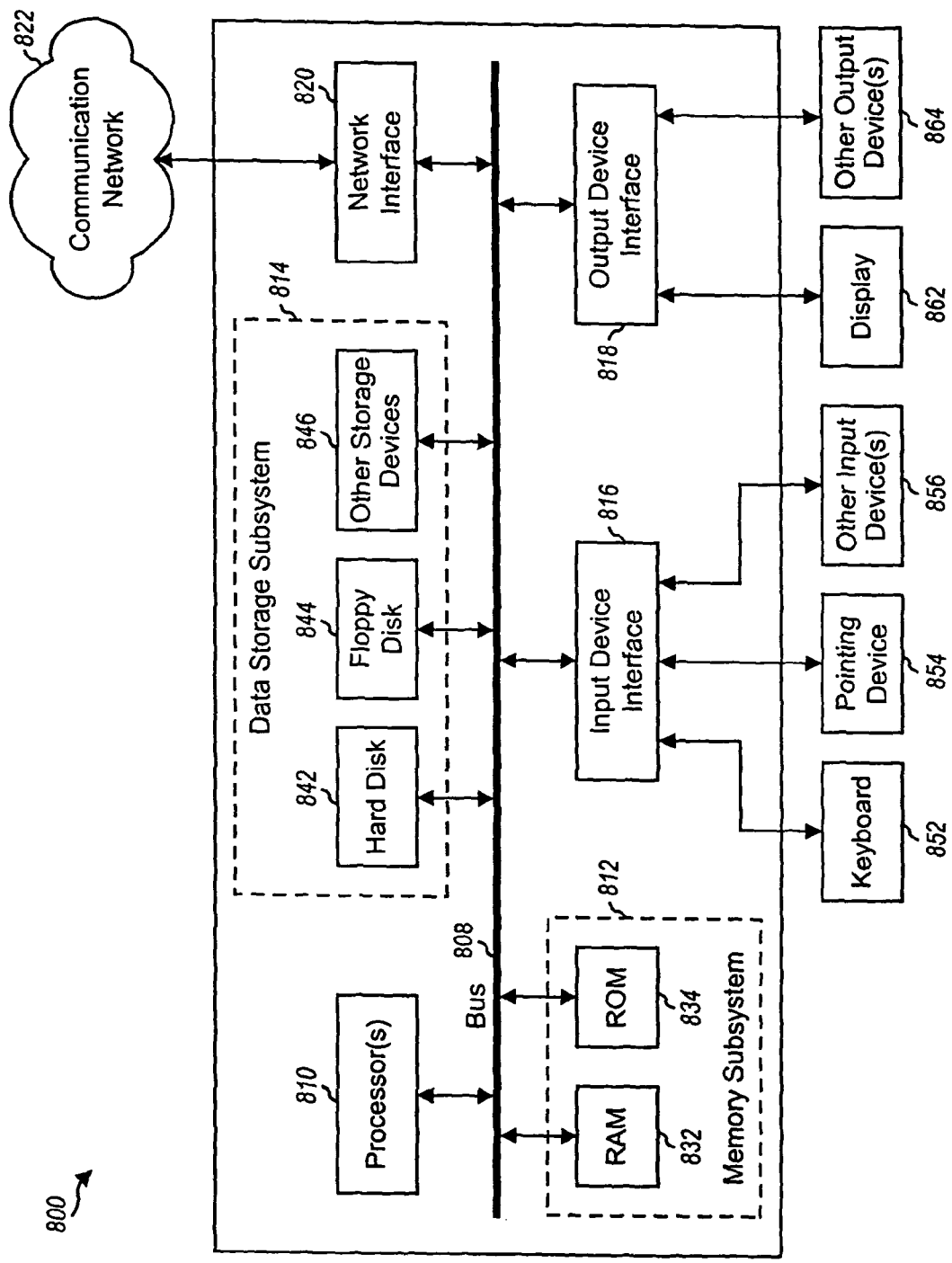
FIG. 8 is a block diagram of a computer system.

FIG. 8 is a block diagram of an embodiment of a computer system 800 that may be used to store and execute program codes that implement system 200 or 700. System 800 includes a bus 808 that interconnects major subsystems such as one or more processors 810, a memory subsystem 812, a data storage subsystem 814, an input device interface 816, an output device interface 818, and a network interface 820. Processor(s) 810 perform many of the processing functions for system 800 and communicate with a number of peripheral devices via bus 808.

Memory subsystem 812 may include a RAM 832 and a ROM 834 used to store codes and data that implement various aspects of the invention. In a distributed environment, the program codes and data may be stored on a number of computer systems and used by the processors of these systems. Data storage subsystem 814 provides non-volatile storage for program codes and data, and may include a hard disk drive 842, a floppy disk drive 844, and other storage devices 846 such as a CD-ROM drive, an optical drive, and removable media drive.

Input device interface 816 provides interface with various input devices such as a keyboard 852, a pointing device 854 (e.g., a mouse, a trackball, a touch pad, a graphics tablet, a scanner, or a touch screen), and other input device(s) 856. Output device interface 818 provides an interface with various output devices such as a display 862 (e.g., a CRT or an LCD) and other output device(s) 864. Network interface 820 provides an interface for system 800 to communicate with other computers coupled to communication network 822.

Many other devices or subsystems (not shown) may also be coupled to system 800. In addition, it is not necessary for all of the devices shown in FIG. 8 to be present to practice the invention. Furthermore, the devices and subsystems may be interconnected in configurations different from that shown in FIG. 8. One or more of the storage devices may be located at remote locations and coupled to system 800 via communication network 822. The operation of a computer system such as that shown in FIG. 8 is readily known in the art and not described in detail herein. The source codes to implement various aspects and embodiments of the invention (e.g., sub-configuration) may be operatively disposed in memory subsystem 812 or stored on storage media such as a hard disk, a floppy disk, or a CD-ROM that is operative with a CD-ROM player.

Headings are provided herein for reference and to aid in locating certain sections. These headings are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer-readable storage medium having embodied therein computer-executable program codes for forming a list of attributes for uniquely identifying a plurality of items in a pageset, wherein said computer-executable program codes, when executed by a computer, cause said computer to perform a method comprising:

receiving the plurality of items in the pageset, wherein
each item is to be defined by a unique combination of values for a plurality of attributes,
each item having equal values for a first subset of the attributes, and
the first subset is less than all of the plurality of attributes;

including the first subset of the attributes in the list of attributes for uniquely identifying the plurality of items in the pageset;

selecting an attribute from a second subset of the attributes, wherein the second subset is less than all of the plurality of attributes, the second subset is disjoint from the first subset, and said selecting is performed by the computer;

determining whether the selected attribute in combination with attributes previously included in the list of attributes uniquely identifies a greater number of items in the pageset than a number of items in the pageset uniquely identified by the attributes previously included in the list of attributes, wherein
said determining is performed by the computer;

including the selected attribute in the list of attributes if said determining establishes that the selected attribute in combination with attributes previously included in the list of attributes uniquely identifies a greater number of items in the pageset than a number of items in the pageset uniquely, identified by the attributes previously included in the list of attributes, wherein
said including is performed by the computer;

excluding the selected attribute from the list of attributes if said determining establishes that the selected attribute in combination with attributes previously included in the list of attributes does not uniquely identify, a greater number of items in the pageset than a number of items in the pageset uniquely, identified by the attributes previously included in the list of attributes, wherein
said excluding is performed by the computer; and performing said selecting and including or excluding for each of the attributes in the second subset until a minimum set of attributes is included in the list of attributes such that each item in the pageset is uniquely identified by its associated values for the attributes in the list.

2. The computer-readable storage medium of claim 1, wherein the second subset of the attributes are provided in an ordered list, and the attributes in the ordered list are selected for consideration based on their order in the ordered list.

3. The computer-readable storage medium of claim 1, wherein the second subset of the attributes are attributes common for all items.

4. The computer-readable storage medium of claim 3, wherein each item in the pageset includes a combination of valid values for the common attributes.

5. The computer-readable storage medium of claim 1, wherein said method further comprises:

including a mandatory attribute in the list of attributes, wherein
the mandatory attribute is preselected.

6. The computer-readable storage medium of claim 5, wherein said method further comprises:

permitting said selecting the attribute from the second subset only if a set of mandatory attributes in the list of attributes is insufficient to uniquely identify each item.

7. The computer-readable storage medium of claim 1, wherein
said second subset includes a plurality of mandatory attributes and a plurality of optional attributes, and
as part of said selecting, an optional attribute from said second subset is selected only after all mandatory attributes are selected and included in said list of attributes, and only if said plurality of mandatory attributes is insufficient to uniquely identify each pageset item.

* * * * *

UNITED STATES PATENT AND TRADEMARK OFFICE
CERTIFICATE OF CORRECTION

| | | |
|---|---|---|
| PATENT NO. | : 7,953,766 B2 | |
| APPLICATION NO. | : 11/080226 | |
| DATED | : May 31, 2011 | |
| INVENTOR(S) | : Gong et al. | |

It is certified that error appears in the above-identified patent and that said Letters Patent is hereby corrected as shown below:

On Title page, in column 2, under "Other Publications", line 1, delete "Indicies," and insert -- Indices, --, therefor.

In column 5, line 25, before "used to" delete "to".

In column 6, line 44, delete "able" and insert -- table --, therefor.

In column 6, line 55, delete "2;" and insert -- 2, --, therefor.

In column 9, line 2, delete "list-type—" and insert -- list-type. --, therefor.

In column 10, line 67, before "empty" insert -- not --.

In column 12, line 65, delete "hey" and insert -- they --, therefor.

In column 17, line 7-8, delete "uncleaniness" and insert -- uncleanliness --, therefor.

In column 18, line 63, in Claim 1, delete "indentify," and insert -- indentify --, therefor.

In column 18, line 65, in Claim 1, delete "uniquely," and insert -- uniquely --, therefor.

Signed and Sealed this
Twenty-fifth Day of October, 2011

David J. Kappos
*Director of the United States Patent and Trademark Office*